(12) United States Patent
Ishii

(10) Patent No.: US 7,435,500 B2
(45) Date of Patent: Oct. 14, 2008

(54) FUEL CELL CASING AND FUEL CELL

(75) Inventor: Itaru Ishii, Kokubu (JP)

(73) Assignee: Kyocera Corporation, Kyoto (JP)

( * ) Notice: Subject to any disclaimer, the term of this patent is extended or adjusted under 35 U.S.C. 154(b) by 0 days.

(21) Appl. No.: 10/877,970

(22) Filed: Jun. 25, 2004

(65) Prior Publication Data
US 2005/0048344 A1 Mar. 3, 2005

(30) Foreign Application Priority Data
Jun. 26, 2003 (JP) ............................ P2003-183146

(51) Int. Cl.
*H01M 2/08* (2006.01)
(52) U.S. Cl. .......................... 429/35; 429/34
(58) Field of Classification Search .................... 429/34
See application file for complete search history.

(56) References Cited

U.S. PATENT DOCUMENTS

| 5,547,777 | A  * | 8/1996  | Richards ................. 429/32 |
| 5,733,675 | A    | 3/1998  | Dederer et al. |
| 6,051,331 | A  * | 4/2000  | Spear et al. ................. 429/34 |
| 6,387,557 | B1 * | 5/2002  | Krasij et al. ................. 429/32 |
| 2001/0049044 | A1 * | 12/2001 | Molter ........................ 429/34 |
| 2002/0187384 | A1 * | 12/2002 | Kato et al. .................... 429/35 |
| 2003/0077498 | A1 * | 4/2003  | Cable et al. .................. 429/32 |
| 2004/0005485 | A1 * | 1/2004  | Yadav et al. .................. 429/12 |
| 2005/0019645 | A1 * | 1/2005  | Thomas et al. ................ 429/36 |

FOREIGN PATENT DOCUMENTS

| DE | 3907485 | 9/1990 |
| JP | 10-106604 | 4/1998 |
| JP | 2001-507501 | 6/2001 |
| JP | 2001-266910 | 9/2001 |
| JP | 2004-178933 | 6/2004 |
| WO | 98/12764 | 3/1998 |
| WO | WO 02/41433 | 5/2002 |

OTHER PUBLICATIONS http://www.matweb.com/search/SpecificMaterial.asp?bassnum=CANDER01.*
http://www.matweb.com/search/SpecificMaterial.asp?bassnum=C5MT33.*
http://www.matweb.com/search/SpecificMaterial.asp?bassnum=O1770.*
Yttria stabilized by Zirconia Datasheet [online]. Matweb, [retrieved on Jan. 4, 2007]. Retrieved from the Internet: <URL: http://www.matweb.com/search/SpecificMaterial.asp?bassnum=C5MT38>.*

* cited by examiner

*Primary Examiner*—Patrick Ryan
*Assistant Examiner*—Cynthia Lee
(74) *Attorney, Agent, or Firm*—Hogan & Hartson LLP

(57) ABSTRACT

The fuel cell casing includes a plural stacked units. Each unit includes a base body having a concavity, for accommodating a membrane electrode assembly; a first fluid channel formed in the base body; a first wiring conductor formed in the base body; a lid body for sealing concavity hermetically; a second fluid channel formed in the lid body; and a second wiring conductor formed in the lid body. The first wiring conductor of a lower unit is electrically connected to the second wiring conductor of an upper unit. Each unit has a convexity on an end portion of a side surface thereof which end portion is on an adjacent unit side, and the units adjacent to each other are bonded to each other at the convexities.

6 Claims, 4 Drawing Sheets

FUEL CELL CASING AND FUEL CELL

BACKGROUND OF THE INVENTION

1. Field of the Invention

The present invention relates to a fuel cell casing that is capable of accommodating a membrane electrode assembly, is made of ceramics, and is small and highly reliable, and to a fuel cell using the same.

2. Description of the Related Art

In recent years, development of compact fuel cells that are operable at a lower temperature than ever before has been briskly under way. Fuel cells are classified according to their electrolytes in use. For example, there have been known Polymer Electrolyte Fuel Cell (hereinafter abbreviated to "PEFC"); Phosphoric-Acid Fuel Cell; and Solid-Oxide Fuel Cell.

Among them, in particular, the PEFC is operable at a temperature as low as 80 to 100° C., and also possesses many excellent characteristics as follows:

(1) its power density is high, and miniaturization and weight reduction are allowed;
(2) since an electrolyte membrane is not corrosive, its operation temperature is low, and therefore the constitution material of the cell is constrained little from the aspect of corrosion-resistance, cost reduction is easy; and
(3) actuation at ordinary temperatures is allowed, and therefore, actuation time is short. By taking advantage of such characteristics, it has been considered to not only apply the PEFC to driving power sources for a vehicle, household cogeneration systems and the like but also use as power sources for mobile electronic apparatuses such as mobile phones, PDAs (personal digital assistants), notebook-type personal computers, digital cameras, videos, and the like whose outputs are a few watts to several tens of watts.

Roughly, the PEFC is composed of a fuel electrode (anode), an air electrode (cathode), and a film-shaped membrane electrode assembly interposed between the fuel electrode and the air electrode. The fuel electrode is formed of a carbon electrode having catalyst fine particles of platinum, platinum-ruthenium, or the like attached thereto. The air electrode is formed of a carbon electrode having catalyst fine particles of platinum or the like attached thereto. Here, the fuel electrode is supplied with hydrogen gas ($H_2$) extracted through a reforming section, whereas the air electrode is supplied with oxygen gas (O2) present in the air. Through an electrochemical reaction, electric energy of certain level is generated (electric power production), and thereby electric energy acting as driving power (voltage/current) for a load is produced.

Specifically, when hydrogen gas ($H_2$) is supplied to the fuel electrode, as shown in the following chemical equation (1), with the action of the catalyst, an electron ($e^-$)-separated hydrogen ion (-proton; $H^+$) is generated, and the proton passes through the membrane electrode assembly toward the air electrode. Simultaneously, the electron ($e^-$) is ejected by the carbon electrode constituting the fuel electrode and is then supplied to a load.

$$3H_2 \rightarrow 6H^+ + 6e^- \quad (1)$$

On the other hand, when air is supplied to the air electrode, as shown in the following chemical equation (2), with the action of the catalyst, the electron ($e^-$) having reached the load and the hydrogen ion ($H^+$) having passed through the membrane electrode assembly, and oxygen gas ($O_2$) present in the air react with one another to form water ($H_2O$).

$$6H^+ + 3/2O_2 + 6e^- \rightarrow 3H_2O \quad (2)$$

Such a series of electrochemical reactions (refer to equations (1) and (2)) commonly take place at a relatively low temperature of approximately 80 to 100° C. Basically, a by-product material other than electric power is water ($H_2O$) alone.

As an ionically conductive membrane (Polymeric solid electrolytes) constituting a membrane electrode assembly, there have hitherto been known a cation-exchange membrane composed of the polystyrene-base having a sulfonic acid group, a mixture membrane of fluorocarbon sulfonic acid and polyvinylidene fluoride, a membrane obtained by grafting trifluoroethylene to a fluorocarbon matrix, and the like. In recent years, for example, a perfluorocarbon sulfonic acid membrane has been in use (available from DuPont Co. under a trade name "Nafion").

FIG. 4 is a sectional view showing the structure of a fuel cell (PEFC) of conventional design. In the figure, reference numeral 21 denotes the PEFC, reference numeral 23 denotes a membrane electrode assembly, and reference numerals 24 and 25 denote a pair of porous electrodes that are arranged on the membrane electrode assembly 23 so as to sandwich therebetween the membrane electrode assembly and that have functions as a gas diffusion layer and a catalyst layer, that is, a fuel electrode and an air electrode, reference numeral 26 denotes a gas separator; reference numeral 28 denotes a fuel duct; reference numeral 29 denotes an air duct; reference numeral 30 denotes current collecting plates; reference numeral 31 denotes clamping plates; and reference numeral 32 denotes screws.

The gas separator 26 is composed of a stack portion; a gas inlet/outlet frame; a separator portion; and electrodes. The stack portion and the gas inlet/outlet frame constitute the outer shape of the gas separator 26. The separator portion serves to separate the fuel duct 28 and the air duct 29. The electrodes are disposed so as to pierce the separator portion and placed so as to correspond to the fuel electrode 24 and the air electrode 25 of the membrane electrode assembly 23. A multiplicity of membrane electrode assemblies 23 are stacked on top of one another via the gas separators 26, in such a way that the fuel and air electrodes 24 and 25 of the membrane electrode assembly 23 are connected in series and/or in parallel with one another through electrical connection. Electric power is obtained by means of the current collecting plates 30. The gas separator 26 is clamped down by the screws 32 at an adequate surface pressure with use of the clamping plates 31. Thereupon, a fuel cell stack, i.e., a minimum unit of a cell, is constructed. By accommodating the fuel cell stack in a casing, a general PEFC main body is realized.

Fuel gas that contains water vapor (gas that is rich in hydrogen) is supplied from a reforming device to the fuel electrode 24 through the fuel duct 28 formed in the gas separator 26 and the air is supplied as oxidant gas from the air to the air electrode 5 through the air duct 29, and electric power is generated by a chemical reaction in the membrane electrode assembly 23.

There is Japanese Unexamined Patent Publication JP-A 2001-266910 and Japanese Unexamined Patent Publication JP-A 2001-507501 as the related art.

However, this fuel cell 21 that has been proposed and developed up to now as a high-voltage and high-capacity cell is a heavy and large cell which has a stack structure and whose constitution elements have large areas, and use of a fuel cell as a small cell has been hardly considered so far.

Specifically, the conventional gas separator 26 disposed in the fuel cell 21 poses a problem that since the side surfaces of the membrane electrode assemblies 23 are exposed outside in a stacked body made by stacking the membrane electrode assemblies 23 by the use of the gas separator, the construction is easily damaged because of a fall at the time of carrying, and it is hard to guarantee mechanical reliability of the whole fuel cell 21.

Furthermore, in order to install the fuel cell 21 in mobile electronic apparatus, a fuel cell casing that is excellent compactness, convenience and safety unlike a conventional large fuel cell casing is necessary. In other words, it is necessary, in order to apply as a portable power source such as a general-purpose chemical cell, to miniaturize and low-profile a fuel cell casing for the purpose of shortening time for increasing temperature up to operation temperature and making a thermal capacity small. However, the gas separator 26 that dominates a large proportion of a thermal capacity in the conventional fuel cell 21, specifically, the gas separator 26 where the ducts are formed on the surface of a carbon plate by cutting processing becomes fragile when becoming thin-walled, and therefore, it needs thickness of a few millimeters. Therefore, there is also a problem that it is hard to miniaturize and low-profile.

There is another problem associated with the output voltage of the fuel cell 21. In a case where the gas separator 26 is made larger in thickness, resistance is increased, and thus voltage losses with respect to output current is increased. As a result, the output voltage is decreased. Further, combinations of a plurality of membrane electrode assemblies 23, the opposed fuel electrodes 24 and air electrodes 25, and the gas separators 26 need to be arbitrarily connected together in series or in parallel with efficiency so as to adjust the output voltage and the output current as a whole. In the conventional fuel cell 21, in order to obtain electric power from the fuel electrode and the air electrode, sandwiching therebetween the membrane electrode assembly 23, such a method is adopted that the current collecting plates 30 are connected with an external electric circuit, and the membrane electrode assemblies are stacked through a plurality of gas separators 26 as conductive materials, and are connected in series by means of the clamping plates 31. In this case, quite inconveniently, the current collecting plate 30, the clamping plate 31, and the screw 32 need to be electrically insulated from one another. Thus, the conventional fuel cell, when made compact, presents the problems of an increase in the number of constituent components; the difficulty in slenderization; and poor flexibility in establishing electrical connection among the individual cells.

SUMMARY OF THE INVENTION

The invention has been devised in view of the above-described problems with the conventional art, and accordingly its object is to provide a compact, sturdy, and highly-reliable fuel cell casing which is capable of accommodating a membrane electrode assembly and allows highly-efficient electrical connection, and also provide a fuel cell employing said fuel cell casing.

The invention provides a fuel cell casing comprising:

a plurality of fuel cell casing units stacked together, each of the fuel cell casing units including, a base body made of ceramics that has a concavity formed on one surface thereof, for accommodating therein a membrane electrode assembly, the membrane electrode assembly having a first electrode and a second electrode which are formed on one principal surface and another principal surface thereof, respectively;

a first fluid channel formed so as to extend from a bottom surface of the concavity facing the one principal surface of the membrane electrode assembly to an outer surface of the base body;

a first wiring conductor having its one end disposed on a bottom surface of the concavity facing the first electrode of the membrane electrode assembly, and its another end led to the outer surface of the base body;

a lid body mounted on the one surface of the base body near the concavity so as to cover the concavity, for sealing the concavity hermetically;

a second fluid channel formed so as to extend from one surface of the lid body facing the other principal surface of the membrane electrode assembly to an outer surface of the lid body; and a second wiring conductor having its one end disposed on one surface of the lid body facing the second electrode of the membrane electrode assembly, and its another end led to the outer surface of the lid body, wherein the first wiring conductor of one fuel cell casing unit is electrically connected to the second wiring conductor of another fuel cell casing unit which is stacked thereon and adjacent thereto, and wherein each of the fuel cell casing units has a convexity which is formed on an end portion of a side surface thereof which end portion is on an adjacent cell casing unit side, and the fuel cell casing units adjacent to each other are bonded to each other at their convexities.

The invention provides a fuel cell casing comprising:

a plurality of fuel cell casing units stacked together, each of the fuel cell casing units including, a base body made of ceramics that has a plurality of concavities formed on one surface thereof, for accommodating therein a membrane electrode assembly, the membrane electrode assembly having a first electrode and a second electrode which are formed on one principal surface and another principal surface thereof, respectively;

a first fluid channel formed so as to extend from a bottom surface of the concavity facing the one principal surface of the membrane electrode assembly to an outer surface of the base body;

a third wiring conductor having its one end disposed on a bottom surface of the concavity facing the first electrode of the membrane electrode assembly, and its another end led to the outer surface of the base body;

a lid body mounted on the one surface of the base body near the concavities so as to cover the concavities, for sealing the concavities hermetically;

a second fluid channel formed so as to extend from one surface of the lid body facing the other principal surface of the membrane electrode assembly to an outer surface of the lid body;

a fourth wiring conductor having its one end disposed on one surface of the lid body facing the second electrode of the membrane electrode assembly, and its another end led to the outer surface of the lid body;

a fifth wiring conductor formed on the base body, having its one end connected to the third wiring conductor facing the first electrode of the membrane electrode assembly on the bottom surface in one of the plurality of concavities, and its another end connected to the third wiring conductor facing the first electrode of the membrane electrode assembly on the bottom in another of the plurality of concavities, wherein the third wiring conductor of one fuel cell casing unit is electrically connected to the fourth wiring conductor of another fuel cell casing unit which is stacked thereon and adjacent thereto, and wherein each of the fuel cell casing units has a convexity which is formed on an end portion of a side surface thereof which end portion is on an adjacent cell casing unit side, and the fuel cell casing units adjacent to each other are bonded to each other at their convexities.

The invention provides a fuel cell casing comprising:

a plurality of fuel cell casing units stacked together, each of the fuel cell casing units including, a base body made of ceramics that has a plurality of concavities formed on one surface thereof, for accommodating therein a membrane electrode assembly, the membrane electrode assembly having a first electrode and a second electrode which are formed on one principal surface and another principal surface thereof, respectively;

a first fluid channel formed so as to extend from a bottom surface of the concavity facing the one principal surface of the membrane electrode assembly to an outer surface of the base body;

a sixth wiring conductor having its one end disposed on a bottom surface of the concavity facing the first electrode of the membrane electrode assembly, and its another end led to the outer surface of the base body;

a lid body mounted on the one surface of the base body near the concavities so as to cover the concavities, for sealing the concavities hermetically;

a second fluid channel formed so as to extend from one surface of the lid body facing the other principal surface of the membrane electrode assembly to an outer surface of the lid body;

a seventh wiring conductor having its one end disposed on one surface of the lid body facing the second electrode of the membrane electrode assembly, and its another end led to the outer surface of the lid body, the fuel cell casing further comprising:

an eighth wiring conductor having its one end connected to the sixth wiring conductor facing the first electrode of the membrane electrode assembly on the bottom surface in one of the plurality of concavities, and its another end led to the one surface of the base body on which the lid body is mounted; and a ninth wiring conductor having its one end connected to the seventh wiring conductor facing the second electrode of the membrane electrode assembly accommodated in another of the plurality of concavities on the one surface of the lid body, and its another end led to the one surface of the lid body to be mounted on the one surface of the base body, so as to face the other end of the eighth wiring conductor, wherein the sixth wiring conductor of one fuel cell casing unit is electrically connected to the seventh wiring conductor of another fuel cell casing unit which is stacked thereon and adjacent thereto, and wherein each of the fuel cell casing units has a convexity which is formed on an end portion of a side surface thereof which end portion is on an adjacent cell casing unit side, and the fuel cell casing units adjacent to each other are bonded to each other at their convexities.

Further, in the invention, the eighth wiring conductor is provided on the other fuel cell casing unit and the ninth wiring conductor is provided on the one fuel cell casing unit, wherein the eighth wiring conductor and the ninth wiring conductor are connected through a connecting wiring conductor.

In the invention, an adhesive used for bonding the convexities together is made of a thermosetting resin material having a curing temperature of 200° C. or below.

Furthermore, in the invention, the base body and the lid body each possess a flexural strength of 200 MPa or above.

Furthermore, in the invention, the base body and the lid body each have a thickness of 0.2 mm to 5 mm.

Furthermore, in the invention, the base body and the lid body are composed of sintered aluminum oxide having a relative density of 90% or above.

Furthermore, the invention provides a fuel cell comprising:

a membrane electrode assembly having a first electrode and a second electrode which are formed on one principal surface and another principal surface thereof, respectively; and the fuel cell casing mentioned above, wherein the membrane electrode assemblies are accommodated in the concavity of the fuel cell casing, one and the other principal surfaces of the membrane electrode assembly are arranged such that fluid can be exchanged between the one principal surface and the first fluid channel and between the other principal surface and the second fluid channel, respectively, the first wiring conductor is electrically connected to the first electrode, the second wiring conductor is electrically connected to the second electrode, and the lid body is mounted on the one surface of the base body near the concavity so as to cover the concavity.

Furthermore, the invention provides a fuel cell comprising:

a membrane electrode assembly having a first electrode and a second electrode which are formed on one principal surface and another principal surface thereof, respectively; and the fuel cell casing mentioned above, wherein the membrane electrode assemblies are accommodated in the plurality of concavities of the fuel cell casing, respectively, one and the other principal surfaces of the membrane electrode assembly are arranged such that fluid can be exchanged between the one principal surface and the first fluid channel and between the other principal surface and the second fluid channel, respectively, the third wiring conductor is electrically connected to the first electrode, the fourth wiring conductor is electrically connected to the second electrode, the fifth wiring conductor is electrically connected to the third wiring conductor, and the lid body is mounted on the one surface of the base body near the concavity so as to cover the concavity.

Furthermore, the invention provides a fuel cell comprising:

a membrane electrode assembly having a first electrode and a second electrode which are formed on one principal surface and another principal surface thereof, respectively; and the fuel cell casing mentioned above, wherein the membrane electrode assemblies are accommodated in the plurality of concavities of the fuel cell casing, respectively, one and the other principal surfaces of the membrane electrode assembly are arranged such that fluid can be exchanged between the one principal surface and the first fluid channel and between the other principal surface and the second fluid channel, respectively, the sixth wiring conductor is electrically connected to the first electrode, the seventh wiring conductor is electrically connected to the second electrode, the one end of the eighth wiring conductor is electrically connected to the sixth wiring conductor, the one end of the ninth wiring conductor is electrically connected to the seventh wiring conductor, the other ends of the eighth and ninth wiring conductors are electrically connected to each other, and the lid body is mounted on the one surface of the base body near the concavity so as to cover the concavity.

According to the invention, the fuel cell casing includes a base body made of ceramics having a concavity formed on one side thereof for accommodating therein a membrane electrode assembly, the membrane electrode assembly having a first electrode and a second electrode which are formed on one principal surface and another principal surface thereof, respectively; and a lid body mounted on the one surface of the base body near the concavity so as to cover the concavity, for sealing the concavity hermetically. With this construction, by sealing the fuel cell casing hermetically, leakage of fluid such as gas can be prevented. Moreover, since there is no need to prepare an extra package in addition to the casing, it is possible to obtain a fuel cell which can be operated with high efficiency, and to achieve miniaturization. Further, the fuel cell is constructed by accommodating a plurality of membrane electrode assemblies in the casing composed of the ceramic-made base body having the concavity formed on the one surface and the lid body for sealing the concavity. Hence, it never occurs that the membrane electrode assembly is exposed outside and therefore the membrane electrode assembly can be protected against damage, with the result that the mechanical reliability of the fuel cell as a whole can be enhanced. Besides, the first and second wiring conductors, or the third to fifth wiring conductors, or the sixth to ninth wiring conductors, each of which has its one end disposed within the casing composed of the concavity and the lid body, are the only components that make electrical contact with the membrane electrode assembly. This frees the membrane electrode assembly as a whole from unnecessary electrical connection, whereby making it possible to obtain a fuel cell which is excellent in reliability and safety. In addition, by using ceramics as a material for constituting the fuel cell casing, the fuel cell can be made highly resistant to corrosion caused by fluid, typified by various gaseous materials.

It should be noted that the first fluid channel is so formed as to extend from the bottom surface of the concavity facing the one principal surface of the membrane electrode assembly to the outer surface of the base body, whereas the second fluid channel is so formed as to extend from one surface of the lid body facing the other principal surface of the membrane electrode assembly to the outer surface of the lid body. The fluid channels are individually formed on their corresponding inner wall surfaces of the casing unit, with the membrane electrode assembly kept sandwiched therebetween. Thereby it is possible to enhance the uniform supply of the fluid to be supplied to the membrane electrode assembly.

Moreover, being made of ceramics which is greater in strength than a conventional carbon molded material, the base body and the lid body can be reduced in thickness, and its resistance can be decreased. As a result, a high-power fuel cell can be realized that suffers little from voltage losses.

Further, the individual fuel cell casing units are fixed to one another, at their convexities, with use of an adhesive. That is, there is no need to prepare current collecting plates and clamping plates. This helps reduce the number of constituent components and also achieve slenderization.

In addition, since the fluid channels are formed separately in the base body and the lid body, each of the fluid channels is excellent in hermeticity. This makes it possible to prevent mixing of two different fluid materials (for example, oxygen gas and hydrogen gas or methanol or the like) that must essentially be separated from each other by the fluid paths. Accordingly, it never occurs that the fuel cell fails to function properly due to fluid mixing, and that flammable fluid materials are ignited and exploded through mixing at a high temperature. As a result, the safety of the fuel cell can be assured.

According to the invention, in the fuel cells, the membrane electrode assembly is accommodated in the concavity of the fuel cell casing, one and the other principal surfaces of the membrane electrode assembly are arranged such that fluid can be exchanged between the one principal surface and the first fluid channel and between the other principal surface and the second fluid channel, respectively, the first wiring conductor is electrically connected to the first electrode, the second wiring conductor is electrically connected to the second electrode, and lid body is mounted on the one surface of the base-body near the concavity so as to cover the concavity. With this construction, since the wiring conductors allow free electrical wiring, the desired voltage and current can be acquired.

It will thus be seen that the invention accomplishes a compact, sturdy, and highly-reliable fuel cell that succeeds in even gas supply and highly-efficient electrical connection by exploiting the advantages of the fuel cell casing embodying the invention.

Moreover, according to the invention, the fuel cell casing has the fifth wiring conductor formed in the base body. The fifth wiring conductor has its one end connected to the third wiring conductor facing the first electrode of the membrane electrode assembly on the bottom surface in one of the plurality of concavities, and its another end connected to the third wiring conductor facing the first electrode of the membrane electrode assembly on the bottom in another of the plurality of concavities. With this construction, a plurality of membrane electrode assemblies can be connected in parallel with one another through electrical connection. This makes it possible to adjust the output current of the fuel cell as a whole properly, and thereby take out electricity in good condition that has been electrochemically produced in the membrane electrode assembly.

Further, according to the invention, the fuel cell casing has the eighth and ninth wiring conductors, respectively, which are formed in the base body having a plurality of concavities for accommodating the membrane electrode assembly and the lid body to be mounted in the base body. The eighth wiring conductor has its one end connected to the sixth wiring conductor facing the first electrode of the membrane electrode assembly on the bottom surface of one of the plurality of concavities, and its other end led to a part of one surface of the base body on which the lid body is mounted. The ninth wiring conductor has its one end connected to the seventh wiring conductor facing the second electrode of the membrane electrode assembly accommodated in the other of the plurality of concavities on one surface of the lid body, and its other end led to a part of one surface of the lid body to be mounted on one surface of the base body, so as to face the other end of the eighth wiring conductor. With this construction, a plurality of membrane electrode assemblies can be connected in series with one another through electrical connection. As a result, although only a little voltage can be obtained through electricity production made by a single membrane electrode assembly, by achieving serial connection, a total voltage can be adjusted properly. This makes it possible to take out electricity in good condition that has been electrochemically produced in the membrane electrode assembly.

According to the invention, in the fuel cell, the membrane electrode assembly is accommodated in the concavity of the fuel cell casing, one and the other principal surfaces of the membrane electrode assembly is arranged such that fluid can be exchanged between them and the first and second fluid channels, the first and second electrodes are electrically connected individually to the first and second wiring conductors, or to the third to fifth wiring conductors, or to the sixth to ninth wiring conductors, and the lid body is mounted on one surface of the base body near the concavity so as to cover the concavity. It will thus be seen that the invention accomplishes a compact, sturdy, and highly-reliable fuel cell that succeeds in highly-efficient electrical connection by exploiting the advantages of the fuel cell casings embodying the invention. Moreover, by connecting a plurality of membrane electrode assemblies in parallel with one another, adjustment can be made to the output current of the fuel cell as a whole, or, by connecting a plurality of membrane electrode assemblies in series with one another, adjustment can be made to a total voltage. This makes it possible to take out electricity in good condition that has been electrochemically produced in the membrane electrode assembly.

Hence, according to the invention, there are provided a fuel cell casing and a fuel cell that are excellent in compactness, convenience, and safety; that allow even fluid supply and highly-efficient electrical connection; and that can be operated with stability for a longer period of time.

According to the invention, in the fuel cell, the membrane electrode assembly is accommodated in the concavity of the fuel cell casing embodying the invention, one and another principal surfaces of the membrane electrode assembly are arranged such that fluid can be exchanged between them and the first and second fluid channels, the first and second electrodes are electrically connected to the first and second wiring conductors, respectively, and the lid body is mounted on one surface of the base body near the concavity so as to cover the concavity. With this construction, it never occurs that the membrane electrode assembly is exposed outside and is therefore subjected to damage. Moreover, the first and second wiring conductors, each of which has its one end disposed inside the casing unit composed of the concavity and the lid body, are the only components that make electrical contact with the membrane electrode assembly. This frees the membrane electrode assembly from unnecessary electrical connection, whereby making it possible to obtain a fuel cell which is excellent in reliability and safety. Further, the first and second fluid channels are individually formed on their corresponding inner wall surfaces of the casing unit, that is, formed on the bottom surface of the concavity in the base body and one surface of the lid body, respectively, so as to have sandwiched therebetween the membrane electrode assembly. This makes it possible to enhance the uniform suppliability of the gas to be supplied to the membrane electrode assembly, and thereby prevent a decrease in the partial pressure of the gas to be supplied to the first and second electrodes of the membrane electrode assembly. Thus, a stable output voltage of predetermined level can be acquired. Further, a stress occurring in the membrane electrode assembly can be suppressed successfully; wherefore the reliability of the fuel cell can be enhanced.

According to the fuel cells of the invention, since the first to ninth wiring conductors allow free three-dimensional wiring, a plurality of membrane electrode assemblies can be arbitrarily connected in series or in parallel with one another, whereby making it possible to adjust the overall output voltage and output current with efficiency. As a result, electricity which has been electrochemically produced in the membrane electrode assemblies can be taken out in good condition.

In addition, the individual fuel cells are fixed to one another, at the convexities adjacent to each other, with use of an adhesive. This eliminates the need to prepare an extra mounting member, with the result that the fuel cell can be made lower and lower in profile.

BRIEF DESCRIPTION OF THE DRAWINGS

Other and further objects, features, and advantages of the invention will be more explicit from the following detailed description taken with reference to the drawings wherein.

DETAILED DESCRIPTION

Figure 1:
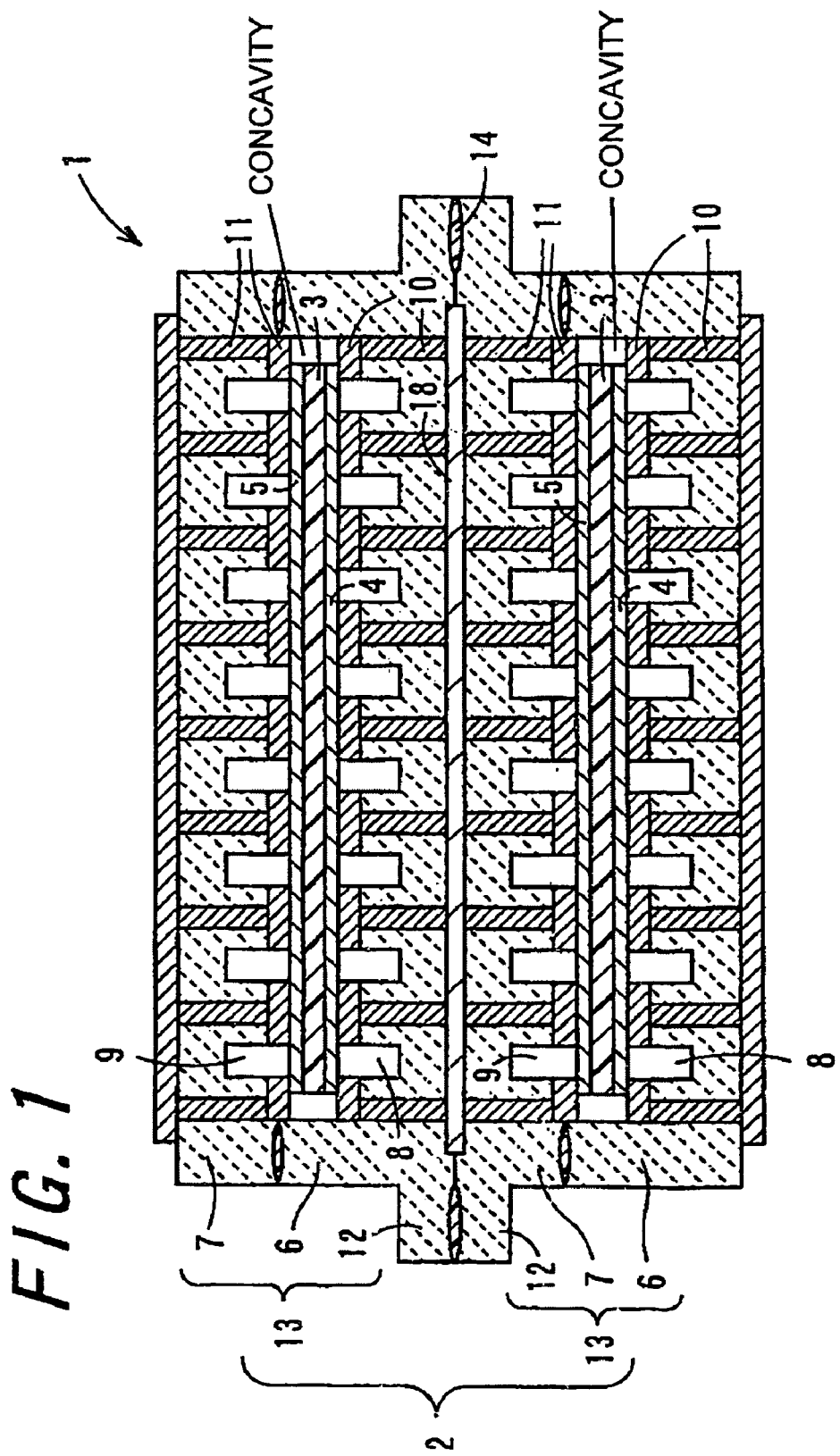
FIG. 1 is a sectional view showing a fuel cell casing and a fuel cell employing the fuel cell casing according to a first embodiment of the invention.

Now referring to the drawings, preferred embodiments of the invention are described below.

Hereinafter, the invention will be described in detail with reference to the accompanying drawings. FIG. 1 is a sectional view showing a fuel cell casing and a fuel cell employing the fuel cell casing according to a first embodiment of the invention. In the figure, reference numeral 1 denotes a fuel cell; reference numeral 2 denotes a fuel cell casing; reference numeral 3 denotes a membrane electrode assembly; reference numeral 4 denotes a first electrode; reference numeral 5 denotes a second electrode; reference numeral 6 denotes a base body; reference numeral 7 denotes a lid body; reference numeral 8 denotes a first fluid channel; reference numeral 9 denotes a second fluid channel; reference numeral 10 denotes a first wiring conductor; reference numeral 11 denotes a second wiring conductor; reference numeral 12 denotes a convexity; reference numeral 13 denotes a fuel cell casing unit; and reference numeral 14 denotes an adhesive.

For instance, the membrane electrode assembly 3 is basically composed of an ionically conductive membrane (Polymeric solid electrolytes). Integrally formed on both principal surfaces of the ionically conductive membrane are a fuel electrode acting as an anode side electrode (not shown) and an air electrode acting as a cathode side electrode (not shown). The first electrode 4 is formed on a lower principal surface which is one principal surface and the second electrode 5 is formed on an upper principal surfaces which is another principal surface, respectively. The electric current generated in the membrane electrode assembly 3 is introduced to the first and second electrodes, and is thereafter taken out.

The ionically conductive membrane (Polymeric solid electrolyte) constituting the membrane electrode assembly 3 is made of perfluorocarbon sulfonic acid resin, for example, proton-conductive ionic exchange resin such as "Nafion" (trade name, product of DuPont). Moreover, the fuel electrode and the air electrode are built as porous gas diffusion electrodes and have both functions of a porous catalyst layer and a gas diffusion layer. The fuel electrode and the air electrode are each made of a porous substance that holds conductive fine particles carrying a catalyst of platinum, palladium, or alloy thereof, for example, carbon fine particles, by a hydrophobic resin binder such as polytetrafluoroethylene.

The first electrode 4 and the second electrode 5 which are disposed on the lower principal surface and the upper principal surface, respectively, of the membrane electrode assembly 3, are formed by a method of hot-pressing a carbon electrode on which fine particles of a catalyst such as platinum or platinum-ruthenium are attached on the membrane electrode assembly 3, a method of applying or transferring a mixture of a carbon electrode material on which fine particles of a catalyst such as platinum or platinum-ruthenium are attached and a solution in which an electrolyte material is dispersed onto an electrolyte membrane, or the like.

The fuel cell casing 2 is composed of a plurality of fuel cell casing units 13 stacked together. The respective fuel cell casing units 13 include the base body 6 having the concavity and the lid body 7, has a function of storing the membrane electrode assembly 3 inside the concavity and hermetically sealing, and is made of a ceramic material such as sintered aluminum oxide ($Al_2O_3$); sintered mullite ($3Al_2O_3 \cdot 2SiO_2$); sintered silicon carbide (SiC); sintered aluminum nitride (AlN); sintered silicon nitride ($Si_3N_4$); or sintered glass ceramic.

The sintered glass ceramic is composed of a glass component and a filler component. The examples of the glass component include: $SiO_2$—$B_2O_3$ composite; $SiO_2$—$B_2O_3$—$Al_2O_3$ composite; $SiO_2$—$B_2O_3$—$Al_2O_3$—MO composite (wherein M denotes Ca, Sr, Mg, Ba, or Zn); $SiO_2$—$Al_2O_3$—$M^1O$—$M^2O$ composite (wherein $M^1$ and $M^2$ are identical or different, and each denote Ca, Sr, Mg, Ba, or Zn); $SiO_2$—$B_2O_3$—$Al_2O_3$—$M^1O$—$M^2O$ composite (wherein $M^1$ and $M^2$ are the same as above); $SiO_2$—$B_2O_3$—$M^3{}_2O$ composite (wherein $M^3$ represents Li, Na, or K); $SiO_2$—$B_2O_3$—$Al_2O_3$—$M^3{}_2O$ composite (wherein $M^3$ is the same as above); Pb glass; and Bi glass.

The examples of the filler component include: a composite oxide obtained by combining $Al_2O_3$, $SiO_2$, $ZrO_2$, and an alkaline earth metal oxide; a composite oxide obtained by combining $TiO_2$ and an alkaline earth metal oxide; and a composite oxide containing at least one of $Al_2O_3$ and $SiO_2$ (for example, spinel, mullite, or cordierite).

The fuel cell casing unit 13 of the fuel cell casing 2 includes the base body 6 having the concavity and the lid body 7. The lid body 7 is mounted on a part of the base body 6 near the concavity so as to cover the concavity, thereby sealing the concavity hermetically. Specifically, the lid body 7 is bonded to the base body 6 with use of a metal bonding material such as solder or silver brazing filler, or a resin material such as epoxy resin. In the alternative, the lid body 7 may be welded to the base body 6. In this case, for example, a seal ring made of an alloy of iron or the like material is bonded to the upper surface which is one principal surface of the base body 6 near the concavity, and then the base body 6 and the lid body 7 are subjected to a seam welding process, an electron beam welding process, or a laser-light welding process. Note that such a concavity as is formed in the base body 6 may be provided also in the lid body 7.

It is preferable that the base body 6 and the lid body 7 each possess a flexural strength, i.e. mechanical strength, of 200 MPa or above. Thereby, the advantage is gained that the thicknesses of the base body 6 and the lid body 7 can be reduced, resulting in the fuel cell 1 being lower in profile.

For example, the base body 6 and the lid body 7 should preferably be made of sintered aluminum oxide of close-grained substance whose relative density is 90% or above. In this case, firstly, rare-earth oxide powder and sintering aids are added and mixed into aluminum oxide powder, and powder materials of sintered aluminum oxide are prepared. Subsequently, an organic binder and a dispersion medium are added and mixed into the powder materials of sintered aluminum oxide to make paste, and by a doctor blade method, or adding an organic binder into the powder materials and conducting press-molding, roll-molding or the like, a green sheet having specified thickness is manufactured from the paste. Then, by punching with a die, a microdrill, a laser or the like, through holes as the first fluid channels 8 and the second fluid channels 9, and openings as fluid passages and through holes for disposing the first wiring conductor 10 and the second wiring conductor 11 are formed on the green sheet.

The first and second wiring conductors 10 and 11 should preferably be composed of tungsten and/or molybdenum to prevent oxidation. In this case, for example, as an inorganic substance, $Al_2O_3$ in an amount of 3 to 20% by mass and $Nb_2O_5$ in an amount of 0.5 to 5% by mass are added to 100 mass percent-tungsten and/or molybdenum powder to form a conductor paste. The conductor paste is then filled in the through hole pierced in the green sheet to form a via hole acting as a through conductor.

Into the conductor paste, for the purpose of increasing close adhesion of the base body 6 and the lid body 7 to ceramics, aluminum oxide powder or powder of the same composite with a ceramics component forming the base body 6 and the lid body 7 can be added, for example, in the ratio of 0.05 to 2% by volume.

The first and second wiring conductors 10 and 11 are formed in the outer and inner layers of the base body 6 and the lid body 7 before, after, or concurrently with the formation of the via conductor which is achieved by filling the conductor paste into the through hole. The formation of the wiring conductors is achieved by print-coating such a conductor paste as shown herein in a predetermined pattern on the green sheet in accordance with the screen printing method, the gravure printing method, or the like printing method.

Thereafter, a predetermined number of sheet-like molded bodies carrying the printed, filled conductor paste are subjected to positional alignment, and are then stacked on top of each other under pressure. The resultant stacked body is then fired, in a non-oxidative atmosphere, at a high temperature of 1200 to 1500° C. As a result, the ceramic-made base body 6, lid body 7, and the first and second wiring conductors 10 and 11 are obtained as designed.

Further, it is preferable that the base body 6 and the lid body 7 made of ceramics each have a thickness of 0.2 mm or more. In a case where the thickness is less than 0.2 mm, the strength is prone to decrease, with the result that the base body 6 and the lid body 7 may suffer from a crack or break due to a stress occurring when the lid body 7 is mounted on the base body 6. By contrast, in a case where the thickness is greater than 5 mm, it becomes difficult to achieve slenderization and low-profile styling, and thus the fuel cell becomes unsuited for a compact portable apparatus. Furthermore, since the thermal capacity is increased, it becomes difficult to swiftly adjust the cell temperature to a certain level appropriate to the electrochemical reaction condition set for the membrane electrode assembly 3.

The first wiring conductor 10 and the second wiring conductor 11 are electrically connected to the first electrode 4 and the second electrode 5, respectively, of the membrane electrode assembly 3 so that they may, function as a current-carrying path for taking the current generated in the membrane electrode assembly 3 out of the fuel cell casing 2, and may serve also as a conventional current collecting plate.

The first wiring conductor 10 has its one end disposed on the bottom surface of tho concavity of the base body 6 facing the first electrode 4 or the membrane electrode assembly 3, and its another end led to an outer surface of the base body 6. As described previously, it is preferable that the first wiring conductor 10 is formed integrally with the base body 6, and is made 10 μm or more higher than the bottom surface of the concavity of the base body 6. This allows the first wiring conductor 10 to make contact with the first electrode 4 with ease. The desired height of the first wiring conductor 10 can be obtained by adjusting the printing condition such that the conductor paste is print-coated in a larger thickness during the print-coating process as described previously. Moreover, the plurality of first wiring conductor 10 should preferably be arranged so a to face the first electrode 4. This helps reduce electric losses ascribable to the first wiring conductor 10. That part of the first wiring conductor 10 which penetrates through the base body 6 should preferably have be set at 50 μm or more in diameter.

The second wiring conductor 11 has its one and disposed on the lower surface which is one principal surface of the lid body 7 facing the second electrode 5 of the membrane electrode assembly 3, and its other end led to the outer surface or the lid body 7. It is preferable that, like the first wiring conductor 10, the second wiring conductor 11 is formed integrally with the lid body 7, and is made 10 μm or more higher than the lower surface lid body 7. This allows the second wiring conductor 11 to make contact with the second electrode 5 with ease. The desired height of the second wiring conductor 11 can be obtained by adjusting the printing condition such that the conductor paste is print-coated in a larger thickness during the print-coating process as described previously. Moreover, the plurality of second wiring conductor 11 should preferably be arranged so as to face the second electrode 5. This helps reduce electric losses ascribable to the second wiring conductor 11. That part of the second wiring conductor 11 which penetrates through the lid body 7 should preferably be set at 50 μm or more in diameter.

It is preferable that each of the first and second wiring conductors 10 and 11 has its exposed surface coated with a highly-conductive metal material made of nickel, gold or the like, which is highly corrosion-resistant and exhibits excellent wearability with respect to a brazing filler material, by means of the plating method. This makes it possible to establish satisfactory electrical connection among the first wiring conductor 10 and the second wiring conductor 11, and among the first wiring conductor 10, the second wiring conductor 11 and an external electric circuit.

When the membrane electrode assembly 3 is grippingly inserted between the base body 6 and the lid body 7, the first and second wiring conductors 10 and 11 are brought into pressure-contact with the first and second electrodes 4 and 5, respectively. At this time, the first and second wiring conductors 10 and 11 can be electrically connected to the first and second electrodes 4 and 5, respectively.

Arranged on the bottom surface of the concavity of the base body 6 facing the first electrode 4 and on the lower surface of the lid body 7 facing the second electrode 5 are the first fluid channel 8 and the second fluid channel 9, respectively. The first fluid channel 8 is so formed as to extend toward the outer surface of the base body 6, whereas the second fluid channel 9 is so formed as to extend toward the outer surface of the lid body 7. The first and second fluid channels 8 and 9 are formed by piercing through holes or grooves in the base body 6 and the lid body 7. The first and second fluid channels 8 and 9 each serve as a passage for a fluid material which is supplied to the membrane electrode assembly 3, for example, fuel gas such as hydrogen-rich reforming gas, or oxidant gas such as air, and also serve as a passage for a fluid to be discharged from the membrane electrode assembly 3 after reactions, for example, water produced through the reactions.

Regarding the through holes or grooves pierced in the base body 6 and the lid body 7 as the first and second fluid channels 8 and 9, the diameter and number of the through hole, or the width, depth, and arrangement of the groove are determined according to the specifications of the fuel cell 1, in such a way that a fluid such as fuel gas or oxidant gas can be evenly supplied to the membrane electrode assembly 3. Specifically, for example, the opening should preferably have a width of 1 mm and a depth of 0.2 mm. Further enhancement of the uniform supply of the fluid can be achieved by reducing the opening width to 100 μm and by increasing the number of the openings.

In the fuel cell 1 embodying the invention, fuel or air is introduced through a through hole or a groove formed in the base body 6 and the lid body 7.

In the fuel cell casing 2 and the fuel cell 1 embodying the invention, the first and second fluid channels 8 and 9 should preferably have an opening which is 1 mm in width and 0.2 mm in depth. More preferably, the opening width should be reduced to 100 μm. This enables a fluid material to flow into the membrane electrode assembly 3 under uniform pressure.

In this way, the first fluid channel 8 is disposed so as to face the lower principal surface of the membrane electrode assembly 3 on which the first electrode 4 is formed, whereas the second fluid channel 9 is disposed so as to face the upper principal surface of the membrane electrode assembly 3 on which the second electrode 5 is formed. With this arrangement, a fluid can be exchanged between the lower and upper principal surfaces of the membrane electrode assembly 3 and their corresponding first and second fluid channels 8 and 9, respectively, and the fluid can be supplied or discharged through the respective fluid paths. Moreover, in the case of supplying gas as a fluid, it is possible to prevent a decrease in the partial pressure of the gas to be supplied to the first and second electrodes 4 and 5 of the membrane electrode assembly 3, and thus obtain a stable output voltage of predetermined level. Further, since the partial pressure of the supplied gas is stabilized, the inner pressure of the fuel cell 1 is made uniform. As a result, a thermal stress occurring in the membrane electrode assembly 3 can be suppressed, leading to enhancement of the reliability of the fuel cell 1.

Moreover, the convexity 12 is identical in shape with the base body 6 and the lid body 7. In the embodiment, the convexities 12 are provided on the base body 6 of the fuel cell casing unit 13 disposed on the upper side and the lid body 7 of the fuel cell casing unit 13 disposed on the lower side adjacent thereto, respectively. Specifically, the convexity 12 provided in the fuel cell casing unit 13 on the upper side is provided so as to protrude from a side portion of the base body 6 thereof adjacent to the fuel cell casing unit 13 on the lower side, outward. The convexity 12 provided in the fuel cell casing units 13 on the lower side is provided so as to protrude from a side portion of the lid body 7 thereof adjacent to the fuel cell casing units 13 on the upper side, outward. The convexities 12 provided in the fuel cell casing units 13 on the upper and lower sides are adjacent to each other. In order to obtain the desired voltage, the fuel cell casing units 13 on the upper and lower sides are stacked together, then the first and second wiring conductors 10 and 11 are electrically connected to each other by using a conductive member 18, and the fuel cell casing units 13 on the upper and lower sides are then connected by fixing to each other at their convexities 12 with use of an adhesive 14. As a result, there will be no need to prepare current collecting plates and clamping plates, and thus the fuel cell 1 can be made lower in profile.

The adhesive 14 used for fixing the convexities 12 is preferably made of a resin-based material such as the epoxy family, the silicon family, or the deformable urethane family. Since the membrane electrode assembly 3 has no high heat resistance, it is preferable that the adhesive 14 has a curing temperature of 200° C. or below. The time required for the curing is determined in accordance with the specifications of the adhesive 14. Note that the fixing may be achieved in ways other than that described just above by way of example. For example, a metal bonding material such as solder or silver brazing filler may be used instead, or a seal ring made of an alloy of iron or the like material may be bondedly formed on the top surface near the convexity 12, followed by performing a welding operation such as the seam welding, the electron beam welding, or the laser welding. In this case, the fixing can be completed instantaneously without putting any temperature load on the membrane electrode assembly 3.

Moreover, the first wiring conductor 10 provided in the base body 6 of the fuel cell casing unit 13 on the upper side, and the second wiring conductor 11 provided in the lid body 7 of the fuel cell casing unit 13 on the lower side are bonded together with use of the conductive member 18.

The conductive member 18 in use is preferably formed of a metal foil tape such as a copper-foil adhesive tape or an aluminum-foil adhesive tape, or an adhesive made of a resin-based material such as epoxy resin, deformable urethane resin, silicon resin, polyimide resin, or acrylic resin to which resin-based material a conductive filler is added. In the alternative, a metal sheet, a mesh-like metal sheet, or the like may be interposed between the conductors to establish contact-connection. In the conductive member 18, its electrical resistance should preferably be set at 10 m$\Omega$/cm$^2$ or below, more preferably, 1 m$\Omega$/cm$^2$. By doing so, voltage losses can be minimized.

With the constructions thus far described, as shown in FIG. 1, it is possible to realize a compact, sturdy fuel cell casing 2 which is capable of accommodating the membrane electrode assembly 3, and a fuel cell 1 which is controllable with high efficiency.

Figure 2:
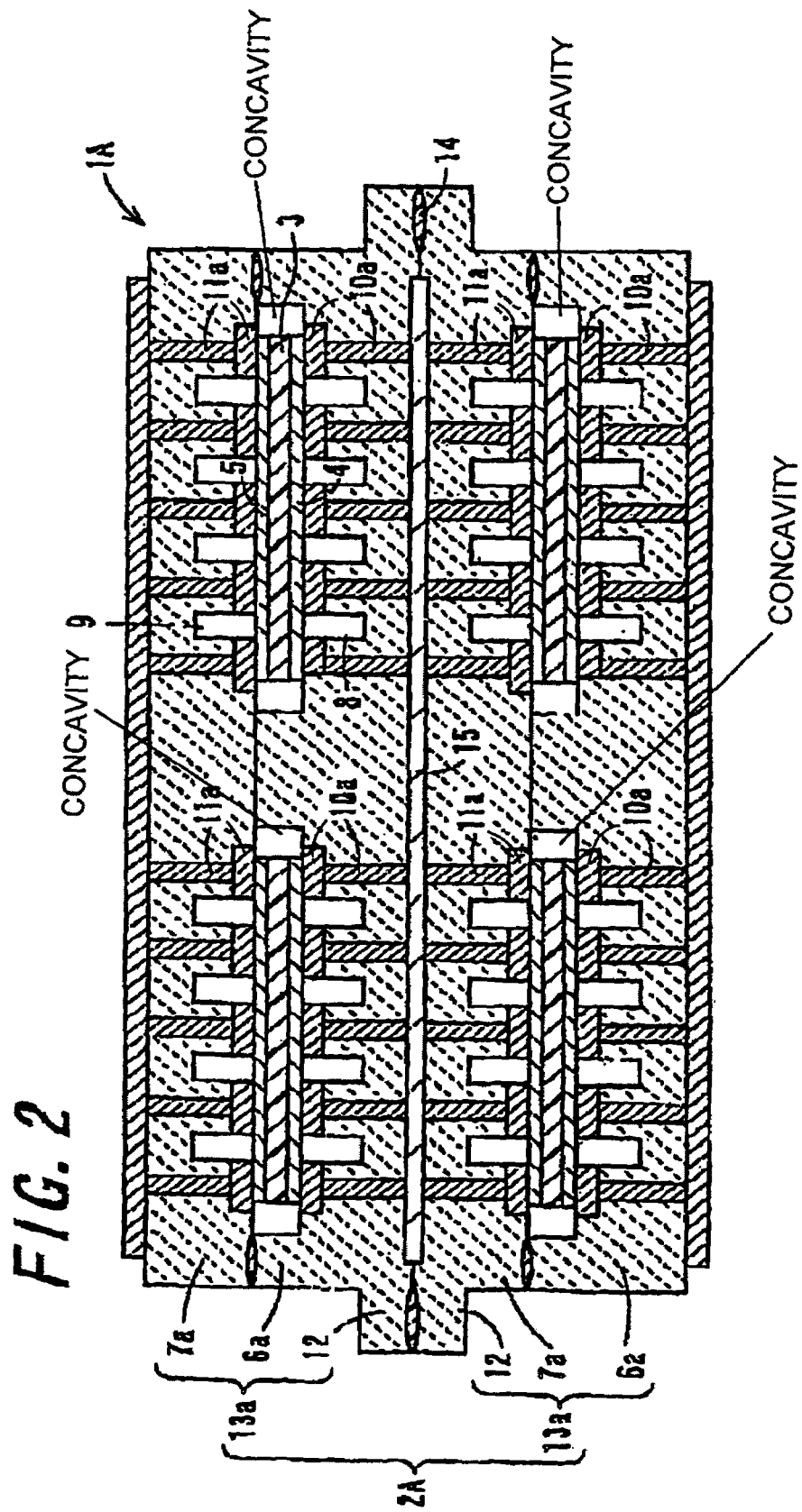
FIG. 2 is a sectional view showing a fuel cell casing and a fuel cell employing the fuel cell casing according to a second embodiment of the invention.

Next, FIG. 2 is a sectional view showing a fuel cell casing and a fuel cell employing the fuel cell casing according to a second embodiment of the invention. In the figure, reference numeral 1A denotes a fuel cell; reference numeral 2A denotes a fuel cell casing; reference numeral 3 denotes a membrane electrode assembly; reference numeral 4 denotes a first electrode; reference numeral 5 denotes a second electrode; reference numeral 6a denotes a base body; reference numeral 7a denotes a lid body; reference numeral 8 denotes a first fluid channel; reference numeral 9 denotes a second fluid channel; reference numeral 10a denotes a third wiring conductor; reference numeral 11a denotes a fourth wiring conductor; reference numeral 12 denotes a convexity; reference numeral 13a denotes a fuel cell casing unit; reference numeral 14 denotes an adhesive; and reference numeral 15 denotes a fifth wiring conductor. In this embodiment, the same components as those of the aforementioned embodiment will be denoted by the same reference numerals, and it will be omitted to describe in detail.

The fuel cell casing 2A is composed of a plurality of fuel cell casing units 13a stacked together. The respective fuel cell casing units 13a include the base body 6a having the plurality of concavities and the lid body 7a and are made of ceramics, like the base body 6 and the lid body 7 of the embodiment mentioned above. The lid body 7a is mounted on a part of the base body 6a near the concavity so as to cover the concavity, thereby sealing the concavity hermetically. Specifically, the lid body 7a is bonded to the base body 6a with use of a metal bonding material such as solder or silver brazing filler, or a resin material such as epoxy resin. In the alternative, the lid body 7a may be welded to the base body 6a. In this case, for example, a seal ring made of an alloy of iron or the like material is bonded to the upper surface of the base body 6a near the concavity, and then the base body 6a and the lid body 7a are subjected to a seam welding process, an electron beam welding process, or a laser-light welding process. Note that such a concavity as is formed in the base body 6a may be provided also in the lid body 7a.

It is preferable that the base body 6a and the lid body 7a each possess a flexural strength, i.e. mechanical strength, of 200 MFa or above. Thereby, the advantage is gained that the thicknesses of the base body 6a and the lid body 7a can be reduced, resulting in the fuel cell 1A being lower in profile. For example, the base body 6a and the lid body 7a should preferably be made of sintered aluminum oxide of close-grained substance whose relative density is 90% or above.

The third wiring conductor 10a and the fourth wiring conductor 11a are electrically connected to tho first electrode 4 and the second electrode 5, respectively, of the membrane electrode assembly 3 so that they may function as a current-carrying path for taking the current generated in the membrane electrode assembly 3 out of the fuel cell casing 2A, and may serve also as a conventional current collecting plate.

The third wiring conductor 10a has its one end disposed on the bottom surface of each concavity of the base body 6a facing the first electrode 4 of the membrane electrode assembly 3, and its another end led to an outer surface of the base body 6a. As described previously, it is preferable that, like the first wiring conductor 10, the third wiring conductor 10a is formed integrally with the base body 6a, and is made 10 μm or more higher than the bottom surface of the concavity of the base body 6a. This allows the third wiring conductor 10a to make contact with the first electrode 4 with ease. The desired height of the third wiring conductor 10a can be obtained by adjusting the printing condition such that the conductor paste is print-coated in a larger thickness during the print-coating process as described previously. Moreover, the plurality of third wiring conductor 10a should preferably be arranged so as to face the first electrode 4. This helps reduce electric losses ascribable to the third wiring conductor 10a. That part of the third wiring conductor 10a which penetrates through the base body 6a should preferably have be set at 50 μm or more in diameter.

The fourth wiring conductor 11a has its one end disposed on the lower surface of the lid body 7a facing the second electrode 5 of the membrane electrode assembly 3, and its another end led to the outer surface of the lid body 7a.

It is preferable that, like the second wiring conductor 11, the fourth wiring conductor 11a is formed integrally with the lid body 7a, and is made 10 μm or more higher than the lower surface of the lid body 7a. This allows the fourth wiring conductor 11a to make contact with the second electrode 5 with ease. The desired height of the fourth wiring conductor 11a can be obtained by adjusting the printing condition such that the conductor paste is print-coated in a larger thickness during the print-coating process as described previously. Moreover, the plurality of fourth wiring conductor 11a should preferably be arranged so as to face the second electrode 5. This helps reduce electric losses ascribable to the fourth wiring conductor 11a. That part of the fourth wiring conductor 11a which penetrates through the lid body 7a should preferably be set at 50 μm or more in diameter.

The fifth wiring conductor 15 is so configured as to provide connection among the third wiring conductors 10a received on the bottom surfaces of a plurality of concavities. That is, the fifth wiring conductor 15 is formed on the base body 6a and has its one end connected to the third wiring conductor 10a facing the first electrode 4 of the membrane electrode assembly 3 on the bottom surface of one of the concavities and its another end connected to the third wiring conductor 10a facing the first electrode 4 of the membrane electrode assembly 3 on the bottom surface of the other of concavities. Thereby, the membrane electrode assemblies 3 accommodated into the respective fuel cell casing units 13a can be connected together in parallel.

In order to obtain the desired voltage, the fuel cell casing units 13a on the upper and lower sides are stacked together, then the third and fourth wiring conductors 10a and 11a are electrically connected to each other by using the fifth wiring conductor 15 which is a conductive member, and the fuel cell casing units 13a on the upper and lower sides are then connected by fixing to each other at their convexities 12 with use of an adhesive 14. As a result, there will be no need to prepare current collecting plates and clamping plates, and thus the fuel cell 1A can be made lower in profile.

Moreover, the third wiring conductor 10a provided in the base body 6a of the fuel cell casing unit 13a on the upper side, and the fourth wiring conductor 11a provided in the lid body 7a of the fuel cell casing unit 13a on the lower side are bonded together with use of the fifth wiring conductor 15 which is a conductive member.

With the constructions thus far described, as shown in FIG. 2, it is possible to realize a compact, sturdy fuel cell casing 2A which is capable of accommodating the membrane electrode assembly 3, and a fuel cell 1A which is controllable with high efficiency.

Figure 3:
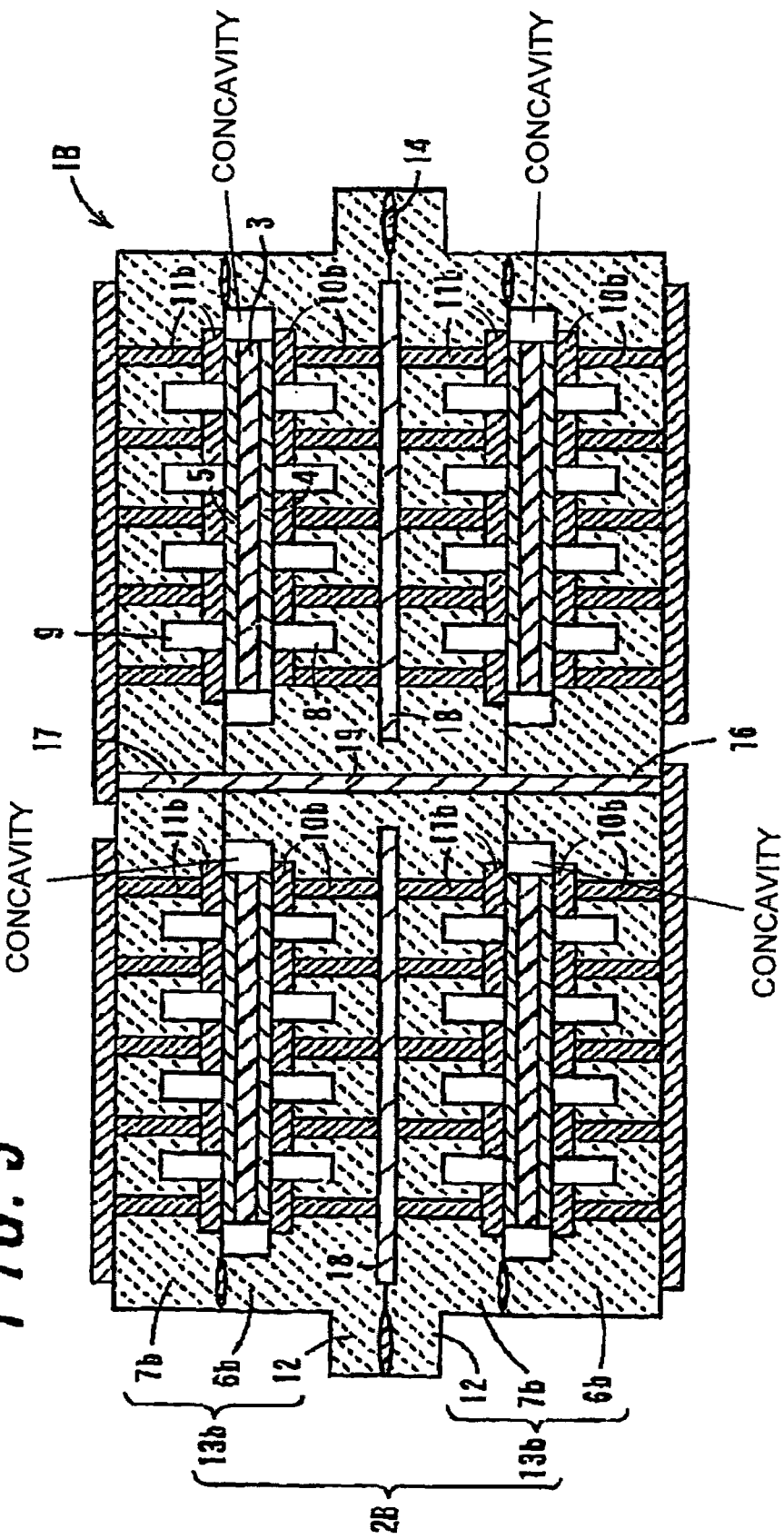
FIG. 3 is a sectional view showing a fuel cell casing and a fuel cell employing the fuel cell casing according to a third embodiment of the invention.
Figure 4:
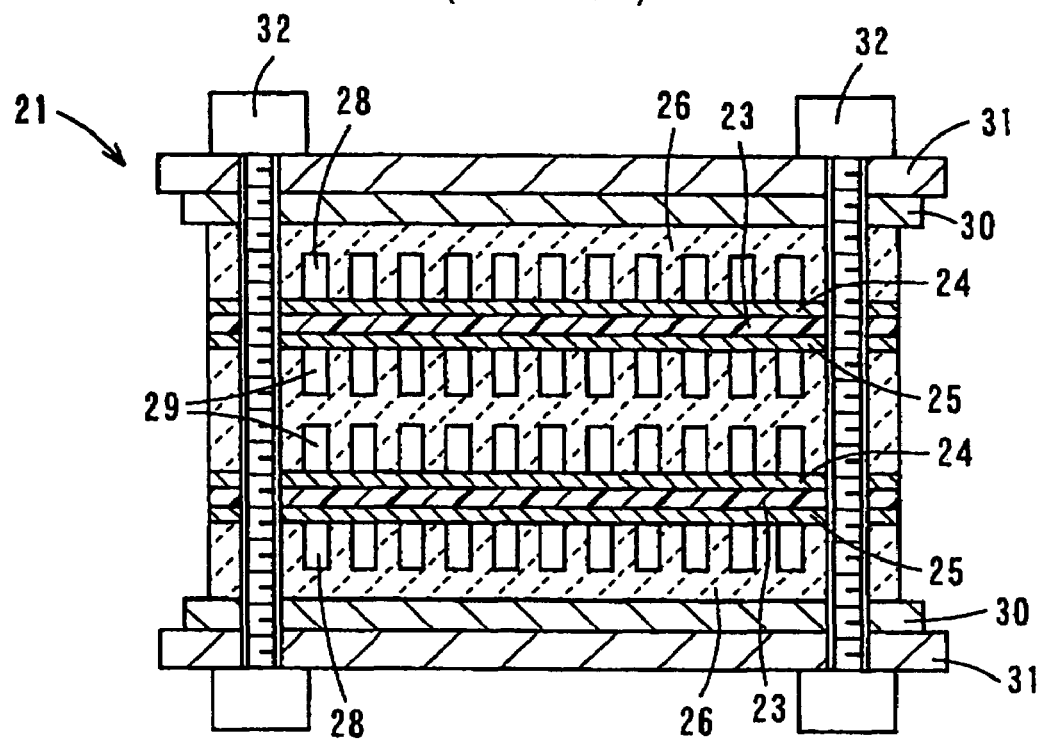
FIG. 4 is a sectional view showing a conventional fuel cell casing and a conventional fuel cell employing the fuel casing.

Next, FIG. 3 is a sectional view showing a fuel cell casing and a fuel cell employing the fuel cell casing according to a third embodiment of the invention. In the figure, reference numeral 1B denotes a fuel cell; reference numeral 2B denotes a fuel cell casing; reference numeral 3 denotes a membrane electrode assembly; reference numeral 4 denotes a first electrode; reference numeral 5 denotes a second electrode; reference numeral 6b denotes a base body; reference numeral 7b denotes a lid body; reference numeral 8 denotes a first fluid channel; reference numeral 9 denotes a second fluid channel; reference numeral 10b denotes a sixth wiring conductor; reference numeral 11b denotes a seventh wiring conductor; reference numeral 12 denotes a convexity; reference numeral 13b denotes a fuel cell casing unit; reference numeral 14 denotes an adhesive; reference numeral 16 denotes an eighth wiring conductor; and reference numeral 17 denotes a ninth wiring conductor. In this embodiment, the same components as those of the aforementioned embodiment will be denoted by the same reference numerals, and it will be omitted to describe in detail.

The fuel cell casing 2B is composed of a plurality of fuel cell casing units 13b stacked together. The respective fuel cell casing units 13b include the base body 6b having the plurality of concavities and the lid body 7b and are made of ceramics, like the base body 6 and 6a and the lid body 7 and 7a of the embodiment mentioned above. The lid body 7b is mounted on a part of the base body 6b near the concavity so as to cover the concavity, thereby sealing the concavity hermetically. Specifically, the lid body 7b is bonded to the base body 6b with use of a metal bonding material such as solder or silver brazing filler, or a resin material such as epoxy resin. In the alternative, the lid body 7b may be welded to the base body 6b. In this case, for example, a seal ring made of an alloy of iron or the like material is bonded to the upper surface of the base body 6b near the concavity, and then the base body 6b and the lid body 7b are subjected to a seam welding process, an electron beam welding process, or a laser-light welding process. Note that such a concavity as is formed in the base body 6b may be provided also in the lid body 7b.

It is preferable that the base body 6b and the lid body 7b each possess a flexural strength, i.e. mechanical strength, of 200 MPa or above. Thereby, the advantage is gained that the thicknesses of the base body 6b and the lid body 7b can be reduced, resulting in the fuel cell 1B being lower in profile. For example, the base body 6b and the lid body 7b should preferably be made of sintered aluminum oxide of close-grained substance whose relative density is 90% or above.

The sixth wiring conductor 10b and the seventh wiring conductor 11b are electrically connected to the first electrode 4 and the second electrode 5, respectively, of the membrane electrode assembly 3 so that they may function as a current-carrying path for taking the current generated in the membrane electrode assembly 3 out of the fuel cell casing 2B, and may serve also as a conventional current collecting plate.

The sixth wiring conductor 10b has its one end disposed on the bottom surface of each concavity of the base body 6b facing the first electrode 4 of the membrane electrode assembly 3, and its another end led to an outer surface of the base body 6b. As described previously, it is preferable that, like the first wiring conductor 10, the sixth wiring conductor 10b is formed integrally with the base body 6b, and is made 10 μm more higher than the bottom surface of the concavity of the base body 6b. This allows the sixth wiring conductor 10b to make contact with the first electrode 4 with ease. The desired height of the sixth wiring conductor 10b can be obtained by adjusting the printing condition ouch that the conductor paste is print-coated in a larger thickness during the print-coating process as described previously. Moreover, the plurality of sixth wiring conductor 10b should preferably be arranged so as to face the first electrode 4. This helps reduce electric losses ascribable to the sixth wiring conductor 10b. That part of the sixth wiring conductor 10b which penetrates through the base body 6b should preferably have be set at 50 μm or more in diameter.

The seventh wiring conductor 11b has its one end disposed on the lower surface of the lid body 7b facing the second electrode 5 of the membrane electrode assembly 3, and its another-end led to the outer surface of the lid body 7b. It is preferable that, like the second wiring conductor 11, the seventh wiring conductor 11b is formed integrally with the lid body 7b, and is made 10 μm or more higher than the lower surface of the lid body 7b. This allows the seventh wiring conductor 11b to make contact with the second electrode 5 with ease. The desired height of the seventh wiring conductor 11b can be obtained by adjusting the printing condition such that the conductor paste is print-coated in a larger thickness during the print-coating process as described previously. Moreover, the plurality of seventh wiring conductor 11b should preferably be arranged so as to face the second electrode 5. This helps reduce electric losses ascribable to the seventh wiring conductor 11b. That part of the seventh wiring conductor 11b which penetrates through the lid body 7b should preferably be set at 50 μm or more in diameter.

The eighth wiring conductor 16 is provided in the fuel cell casing unit 13b on the lower side, and has its one end connected to the sixth wiring conductor 10b facing the first electrode 4 of the membrane electrode assembly 3 on the bottom surface in one of the concavities, and its another end led to the upper surface on which the lid body 7b of the base body 6b is mounted. The ninth wiring conductor 17 is provided in the fuel cell casing unit 13b on the upper side, and has its one end connected to the seventh wiring conductor 11b facing the second electrode 5 of the membrane electrode assembly 3 in the other of the concavities, and its another end led to the lower surface of the lid body 7b to be mounted on the upper surface of the base body 6b, so as to face the other end of the eighth wiring conductor 16. A connecting wiring conductor 19 is formed so as to penetrate through the base body 6b of the fuel cell casing unit 13b on the upper side and the lid body 7b of the fuel cell casing unit 13b on the lower side and electrically connected to the other end of the eighth wiring conductor 16 and the other end of the ninth wiring conductor 17.

In order to obtain the desired voltage, the fuel cell casing units 13b on the upper and lower sides are stacked together; one side of the sixth wiring conductor 10b of the fuel cell casing unit 13b on the upper side and one side of the seventh wiring conductor 11b of the fuel cell casing unit 13b on the lower side are electrically connected to each other by using the conductive member 18; another side of the sixth wiring conductor 10b of the fuel cell casing unit 13b on the upper side and another side of the seventh wiring conductor 11b of the fuel cell casing unit 13b on the lower side are electrically connected to each other by using the conductive member 18; the other end of the eight wiring conductor 16 and the other end of the ninth wiring conductor 17 are electrically connected to each other by using the connecting wiring conductor 19; and the fuel cell casing units 13b on the upper and lower sides are then connected by fixing to each other at their convexities 12 with use of an adhesive 14. Thereby, the membrane electrode assembly 3 accommodated into the respective fuel cell casing units 13b can be connected together in series. As a result, there will be no need to prepare a current collecting plate and a clamping plate, and thus the fuel cell 1B can be made lower in profile.

Moreover, the sixth wiring conductor 10b provided in the base body 6b of the fuel cell casing unit 13b on the upper side, and the seventh wiring conductor 11b provided in the lid body 7b of the fuel cell casing unit 13b on the lower side are bonded together with use of the conductive member 18.

With the constructions thus far described, as shown in FIG. 3, it is possible to realize a compact, sturdy fuel cell casing 2B which is capable of accommodating the membrane electrode assembly 3, and a fuel cell 1B which is controllable with high efficiency.

Moreover, in the embodiment, in the fuel cell casing 2B, four membrane electrode assemblies 3 are connected in series by using two fuel cell casing units 13b, however, two membrane electrode assemblies 3 of the respective fuel cell casing units 13b may be connected in series. In this case, the first electrodes 4 of one side of the membrane electrode assemblies 3 and one side of the sixth wiring conductor 10b are connected together, one side of the sixth wiring conductor 10b and the one end of the eighth wiring conductor 16 are connected together, the second electrodes 5 of another side of the membrane electrode assemblies 3 and another side of the seventh wiring conductor 11b are connected together, another side of the seventh wiring conductor 11b and the one end of the ninth wiring conductor 17 are connected together, and the other end of the eighth wiring conductor 16 and the other end of the ninth wiring conductor 17 are connected together. Thereby, the respective membrane electrode assemblies 3 in a fuel cell casing unit are connected in series.

Moreover, the fuel cell casing and the fuel cell may be constructed by stacking a plurality of fuel cell casing units mentioned above. In this case, another side of the sixth wiring conductor 10b of one of the fuel cell casing units and one side of the seventh wiring conductor 11b of the other of the fuel cell casing units are connected together. Thereby, these membrane electrode assemblies 3 are connected in series.

As shown in FIGS. 1, 2, and 3, according to the fuel cell casings 2, 2A and 2B and the fuel cells 1, 1A and 1B embodying the invention, the membrane electrode assembly 3 is accommodated in each of one or a plurality of concavities of the base body 6, 6a and 6b. Moreover, the fifth wiring conductor 15, or the eighth and ninth wiring conductors 16 and 17, is/are so disposed as to extend across the region between the adjacent concavities. Thereby, in terms of a plurality of membrane electrode assemblies 3, their respective first electrodes 4, or first and second electrodes 4 and 5, are electrically connected together. In order to obtain the overall output, the first wiring conductor 10, the third wiring conductor 10a, or the sixth wiring conductor 10b; and the second wiring conductor 11, the fourth wiring conductor 11a, or the seventh wiring conductor 11b are respectively connected to the endmost membrane electrode assemblies 3 through electrical connection. It will thus be seen that the first and second wiring conductors 10 and 11; the third, fourth, and fifth wiring conductors 10a, 11a, and 15; or the sixth, seventh, eighth, and ninth wiring conductors 10b, 11b, 16, and 17 allow free three-dimensional wiring. Thus, a plurality of membrane electrode assemblies 3 can arbitrarily be connected in series or in parallel with one another; wherefore the overall output voltage and output current can be adjusted with efficiency. As a result, electricity which has been electrochemically produced in a plurality of membrane electrode assemblies 3 can be taken out of the fuel cell in good condition.

It should be noted that the invention need not be limited to the above-described embodiments and examples, and therefore various changes and modifications are possible without departing from the spirit or scope of the invention. For example, inlet and outlet of each of the first and second fluid channels may be formed by disposing a metal pipe or the like on the side surface of the base body or the lid body. In this case, the entire fuel cell is slenderized effectively, and is thus suited for a portable electronic apparatus. Moreover, in the first and second wiring conductors, as well as in the sixth and seventh wiring conductors, although their other ends are led to the outer surfaces of the base body and the lid body, respectively, it is also possible to lead them to the same side surface. In this case, the wiring lines, the fluid paths, etc. can be put together only on one side surface of the fuel cell. This helps facilitate miniaturization and protection of the externally-connected portions. As a result, the fuel cell can be designed with high reliability and accordingly operated with stability for a longer period of time. Moreover, in the embodiment, the number of the fuel cell casing units used for constructing the fuel cell casing is two, however, it is not restricted to the aforementioned number, and may be three or more.

The fuel cell of the invention is designed to be incorporated as a power source in a variety of electronic apparatuses. The concrete examples thereof include: portable electronic apparatuses such as cellular mobile phones, PDAs (Personal Digital Assistants), digital cameras, video cameras, and toys like a portable game machine; household electric appliances such as laptop PCs (personal computers), portable printers, facsimile machines, television sets, communication devices, audio/video systems, and electric fans; and electronic apparatuses such as power tools. The use of the fuel cell 1 of the invention confers advantages on that type of electronic apparatus. For example, being made of a ceramic material which is greater in strength than a conventional carbon molded material, the base body and the lid body can be reduced in thickness, and their resistance can be decreased. As a result, the electronic apparatus incorporating the fuel cell of the invention succeeds in providing high electricity-production efficiency; in reducing voltage losses; and in operating with stability for a longer period of time.

Another advantage is as follows. Since the individual fuel cell casing units are fixed to one another at their convexities with use of an adhesive, there is no need to prepare current collecting plates and clamping plates. This helps reduce the number of constituent components and thus achieve slenderization. By using the cell system of the invention that is excellent in compactness and convenience, the electronic apparatus main body can be made compact, thin-walled, and lightweight. Besides, for example, even if a portable phone main body receives an impact due to a fall or the like accident, the construction is able to offer higher impact resistance and higher water resistance than ever before.

Further, in the fuel cell and the fuel cell casing of the invention, the external connection terminal or the like component should preferably be formed integrally therewith, but made attachable and detachable therefrom. By doing so, for example, in case of battery exhaustion, all that needs to be done is simply to replace the fuel cell or the fuel cell casing with the new one, and accordingly no time is required to carry out charging. As a result, the cell system can stay in action even in an outdoor location, or even when some emergency arises such as a power blackout.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A fuel cell casing comprising:

a plurality of fuel cell casing units stacked together, each of the fuel cell casing units including, a base body made of ceramics that has a concavity formed on one surface thereof, the concavity accommodates therein a membrane electrode assembly, the membrane electrode assembly having an ionically conductive membrane, a first electrode formed on one principal surface of the ionically conducting membrane and a second electrode formed on another principal surface of the ionically conducting membrane;

a first fluid channel formed so as to extend from a bottom surface of the concavity facing the first electrode of the membrane electrode assembly to an outer surface of the base body;

a plurality of first wiring conductors each having its one end disposed on a bottom surface of the concavity facing the first electrode of the membrane electrode assembly, and its another end led to the outer surface of the base body;

a lid body mounted on the one surface of the base body near the concavity so as to cover the concavity, for sealing the concavity hermetically;

a second fluid channel formed so as to extend from one surface of the lid body facing the second electrode of the membrane electrode assembly to an outer surface of the lid body; and a plurality of second wiring conductors each having its one end disposed on one surface of the lid body facing the second electrode of the membrane electrode assembly, and its another end led to the outer surface of the lid body; and one conducting member disposed between the plurality of first wiring conductors of one fuel cell casing unit and the plurality of second wiring conductors of another fuel cell casing unit, the plurality of first wiring conductors of one fuel cell casing unit being commonly connected to the one conducting member, and the plurality of second wiring conductors of another fuel cell casing unit being commonly connected to the one conducting member, wherein each of the fuel cell casing units has a convexity which is formed on an end portion of a side surface thereof which end portion is on an adjacent cell casing unit side, and the fuel cell casing units adjacent to each other are bonded to each other at their convexities.

2. The fuel cell casing of claim 1, wherein an adhesive used for bonding the convexities together is made of a thermosetting resin material having a curing temperature of 200° C. or below.

3. The fuel cell casing of claim 1, wherein the base body and the lid body each possess a flexural strength of 200 MPa or above.

4. The fuel cell casing of claim 1, wherein the base body and the lid body each have a thickness 0.2 mm to 5 mm.

5. The fuel cell casing of claim 1, wherein the base body and the lid body are composed of sintered aluminum oxide having a relative density of 90% or above.

6. A fuel cell comprising:

a plurality of fuel cell units stacked together, each of the fuel cell units including, a membrane electrode assembly having an ionically conducting membrane, a first electrode formed on one principal surface of the ionically conducting membrane and a second electrode formed on another principal surface of the ionically conducting membrane, and a fuel cell casing unit, including, a base body made of ceramics that has a concavity formed on one surface thereof, the concavity accommodates therein the membrane electrode assembly, a first fluid channel formed so as to extend from a bottom surface of the concavity facing the first electrode of the membrane electrode assembly to an outer surface of the base body;

a plurality of first wiring conductors each having its one end disposed on a bottom surface of the concavity facing the first electrode of the membrane electrode assembly, and its another end led to the outer surface of the base body;

a lid body mounted on the one surface of the base body near the concavity so as to cover the concavity, for sealing the concavity hermetically;

a second fluid channel formed so as to extend from one surface of the lid body facing the second electrode of the membrane electrode assembly to an outer surface of the lid body;

a plurality of second wiring conductors each having its one end disposed on one surface of the lid body facing the second electrode of the membrane electrode assembly, and its another end led to the outer surface of the lid body; and one conducting member disposed between the plurality of first wiring conductors of one fuel cell casing unit and the plurality of second wiring conductors of another fuel cell casing unit, the plurality of first wiring conductors of one fuel cell casing unit being commonly connected to the one conducting member, and the plurality of second wiring conductors of another fuel cell casing unit being commonly connected to the one conducting member, wherein the membrane electrode assembly is accommodated in the concavity of the fuel cell casing unit, one and the other principal surfaces of the ionically conducting membrane are arranged such that fluid can be exchanged between the one principal surface and the first fluid channel and between the other principal surface and the second fluid channel, respectively, the first wiring conductor is electrically connected to the first electrode, the second wiring conductor is electrically connected to the second electrode, and the lid body is mounted on the one surface of the base body near the concavity so as to cover the concavity, and wherein each of the fuel cell casing units has a convexity which is formed on an end portion of a side surface thereof which end portion is on an adjacent cell casing unit side, and the fuel cell casing units adjacent to each other are bonded to each other at their convexities.

* * * * *